US006480198B2

(12) United States Patent
Kang

(10) Patent No.: US 6,480,198 B2
(45) Date of Patent: Nov. 12, 2002

(54) MULTI-FUNCTION CONTROLLER AND METHOD FOR A COMPUTER GRAPHICS DISPLAY SYSTEM

(75) Inventor: Dan C. Kang, Sunnyvale, CA (US)

(73) Assignee: S3 Graphics Co., Ltd., Grand Cayman (KN)

( * ) Notice: Subject to any disclaimer, the term of this patent is extended or adjusted under 35 U.S.C. 154(b) by 0 days.

(21) Appl. No.: 09/481,371

(22) Filed: Jan. 10, 2000

(65) Prior Publication Data

US 2001/0012015 A1 Aug. 9, 2001

(Under 37 CFR 1.47)

Related U.S. Application Data

(63) Continuation of application No. 08/884,361, filed on Jun. 27, 1997, now Pat. No. 6,052,133.

(51) Int. Cl.[7] .................................................. G06F 15/76

(52) U.S. Cl. ....................... 345/519; 345/520; 345/532; 345/542

(58) Field of Search ................................ 345/302, 502, 345/507–509, 512, 513, 519–521, 526, 531, 541, 542, 557, 536, 532; 710/100, 126–129

(56) References Cited

U.S. PATENT DOCUMENTS

| | | | | | |
|---|---|---|---|---|---|
| 5,553,220 | A | * | 9/1996 | Keene | 395/520 |
| 5,678,009 | A | * | 10/1997 | Bains et al. | 710/125 |
| 5,732,224 | A | * | 3/1998 | Gulick et al. | 710/100 |
| 5,740,383 | A | * | 4/1998 | Nally et al. | 711/151 |
| 5,748,203 | A | * | 5/1998 | Tang et al. | 345/521 |
| 5,793,996 | A | * | 8/1998 | Childers et al. | 710/129 |
| 5,796,413 | A | * | 8/1998 | Shipp et al. | 345/522 |
| 5,850,207 | A | * | 12/1998 | Eglit | 345/132 |

* cited by examiner

*Primary Examiner*—Kee M. Tung
(74) *Attorney, Agent, or Firm*—Carr & Ferrell LLP

(57) ABSTRACT

A multi-function controller in a computer graphics system performs the functions of a graphics processor, a video processor, a system memory controller, a cache controller, and a PCI bridge. The multi-function controller is connected to the host bus of the computer graphics display system to maximize performance. A graphics frame buffer and a system memory are combined into a unified system memory, which is controlled by and coupled to the multi-function controller.

7 Claims, 7 Drawing Sheets

MULTI-FUNCTION CONTROLLER AND METHOD FOR A COMPUTER GRAPHICS DISPLAY SYSTEM

This application is a continuation of the application Ser. No. 08/884,361, filed Jun. 27, 1997, now U.S. Pat. No. 6,052,133.

BACKGROUND OF THE INVENTION

1. Field of the Invention

This invention relates generally to a computer graphics/video display system, and more specifically to an multi-function controller in a computer graphics/video display system.

2. Description of the Related Art

FIG. 1 illustrates a conventional computer graphics/video display system 10 that generates a graphics or video image. This system includes three buses: a host bus 22, a Peripheral Component Interconnect/Interface (PCI) bus 24 and an Industry Standard Architecture (ISA) bus 26. The host bus 22 can run at 50–100 MHz and can be 8 or more bytes wide. The PCI bus 24, which is an industry standard bus, runs at 33 MHz and is 4 bytes wide, and the ISA bus 26, which is also an industry standard bus, runs at 6–8 MHz and is two bytes wide.

A central processing unit (CPU) 28 and a cache memory 30 are connected to the host bus 22. A cache controller/system memory controller/PCI bridge unit 32, connected to both the host bus 22 and the PCI bus 24, controls the cache 30 and a system memory device 34 and controls information flow between the host bus 22 and the PCI bus 24. A data buffer 36, connected to both the host bus 22 and the PCI bus 24, stores data traveling to and from the memory device 34. A PCI bus master 35 controls the transfer of information on the PCI bus 24 to and from the system memory 34.

A south bridge 42, which is connected between the ISA bus 26 and the PCI bus 24, controls information traveling between the PCI bus 24 and the ISA bus 26. An ISA bus master 44 controls the flow of information on the ISA bus 26 to and from the system memory 34. In response to a command from the CPU 28, a graphics processor 46 generates graphics data, which is then stored in a local frame buffer 47 or displayed as an image on a monitor 20. In response to a command from the CPU 28, a video processor 37 generates video data for display on monitor 20.

A disadvantage with the system illustrated in FIG. 1 is that the PCI bus 24, to which the graphics and video processors are connected, does not have enough speed to allow the graphics and video processors to perform the functions required by many advanced graphics/video display systems. Specifically, the graphics and video processors cannot access system memory 34 as quickly as is desired. Additionally, the system illustrated in FIG. 1 does not give the graphics and video processors direct access to system memory 34, thus resulting in a higher cost because a local frame buffer 47 must be used. Therefore, there is a need for a graphics/video display system which will have a graphics/video processor that can easily access system memory, which will have the capacity to perform functions required by advanced graphics systems, and which will be economical.

SUMMARY OF THE INVENTION

The present invention provides a method and a system for displaying graphics or video images on a monitor. Using a novel architecture, the present invention combines the above-described functions of the graphics processor, the video processor, and the system memory controller/cache controller/PCI bridge unit into an multi-function controller connected to both the host bus and the PCI bus (or other similar buses). The multi-function controller may comprise one or more chips.

By incorporating the graphics/video processor into a controller that is linked to the host bus, the present invention overcomes the conventional system limitations associated with coupling the graphics processor to the PCI bus. Since the host bus is faster than the PCI bus, information can travel faster to and from the graphics/video processor than it would travel if the graphics/video system were just coupled to the PCI bus.

Moreover, in one embodiment, the graphics frame buffer and the system memory are combined into a unified system memory, which is controlled by the multi-function controller. A unified system memory has more space than a regular frame buffer, and using the unified system memory uses less parts than using both a frame buffer and a separate system memory. Additionally, having the multi-function controller control the unified system memory allows the graphics/video processor to have direct access to the unified system memory.

In a preferred embodiment, the multi-function controller is divided into a combined PCI bridge/cache controller and a unified graphics/video controller. The combined PCI bridge/cache controller includes a PCI bridge and a cache controller. The unified graphics/video controller includes a graphics/video processor and a system memory controller. By integrating the PCI bridge and cache controller and by integrating the graphics/video processor and the system memory controller, the number of chips in the system of the present invention is reduced.

The combined PCI bridge/cache controller and the unified graphics/video processor are coupled by a communications link. All commands for the unified graphics/video controller from various components in the system of the present invention are sent to the combined PCI bridge/cache controller, which via the communications link, passes the commands to the unified graphics/video controller. Sending all commands for the unified graphics/video controller to the combined PCI bridge/cache controller promotes efficiency because commands are then directly sent to the unified graphics/video controller from only one place.

DETAILED DESCRIPTION OF THE PREFERRED EMBODIMENT

Figure 1:
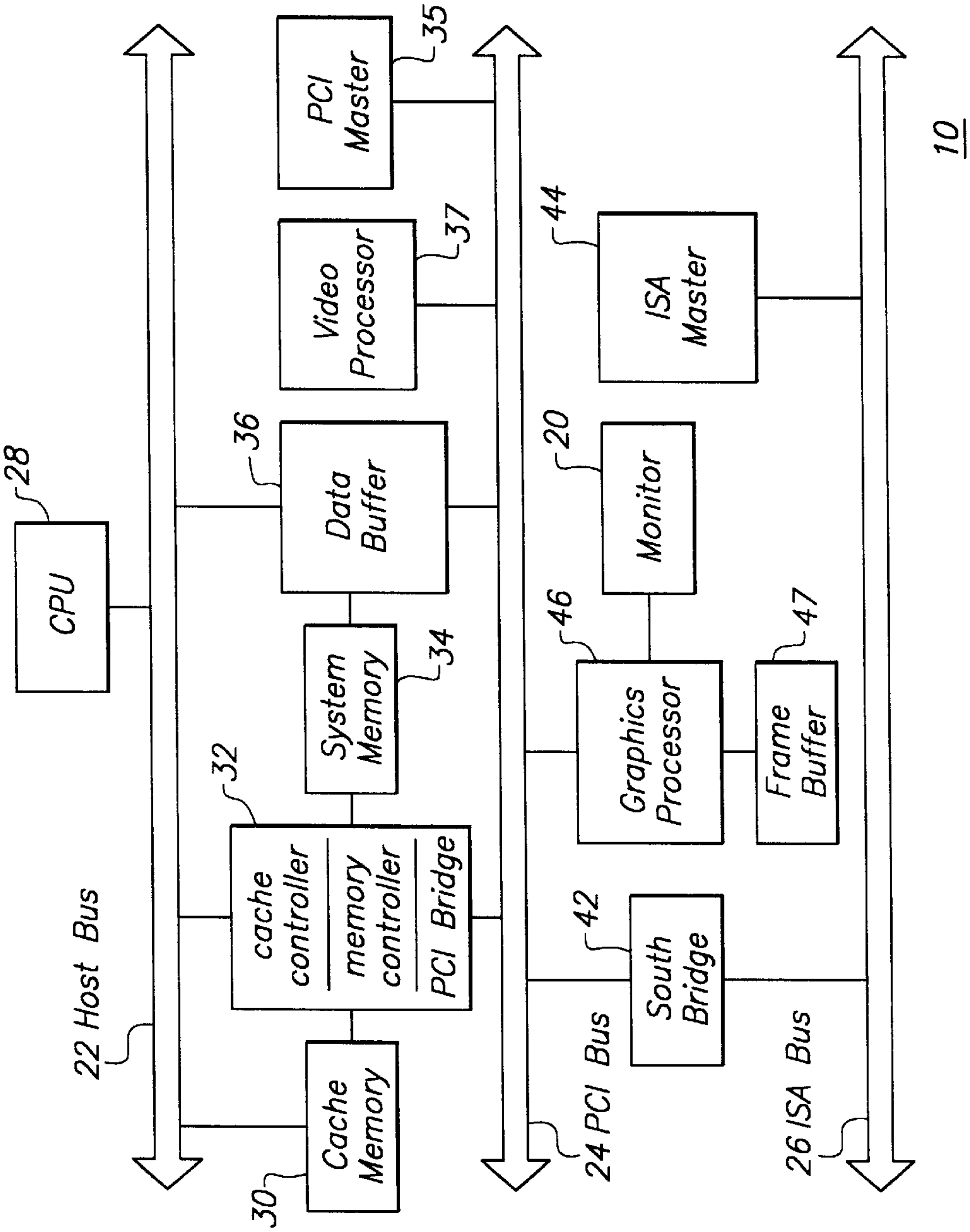
FIG. 1 (PRIOR ART)
FIG. 1 is a block diagram of a conventional graphics/video display system.
Figure 2:
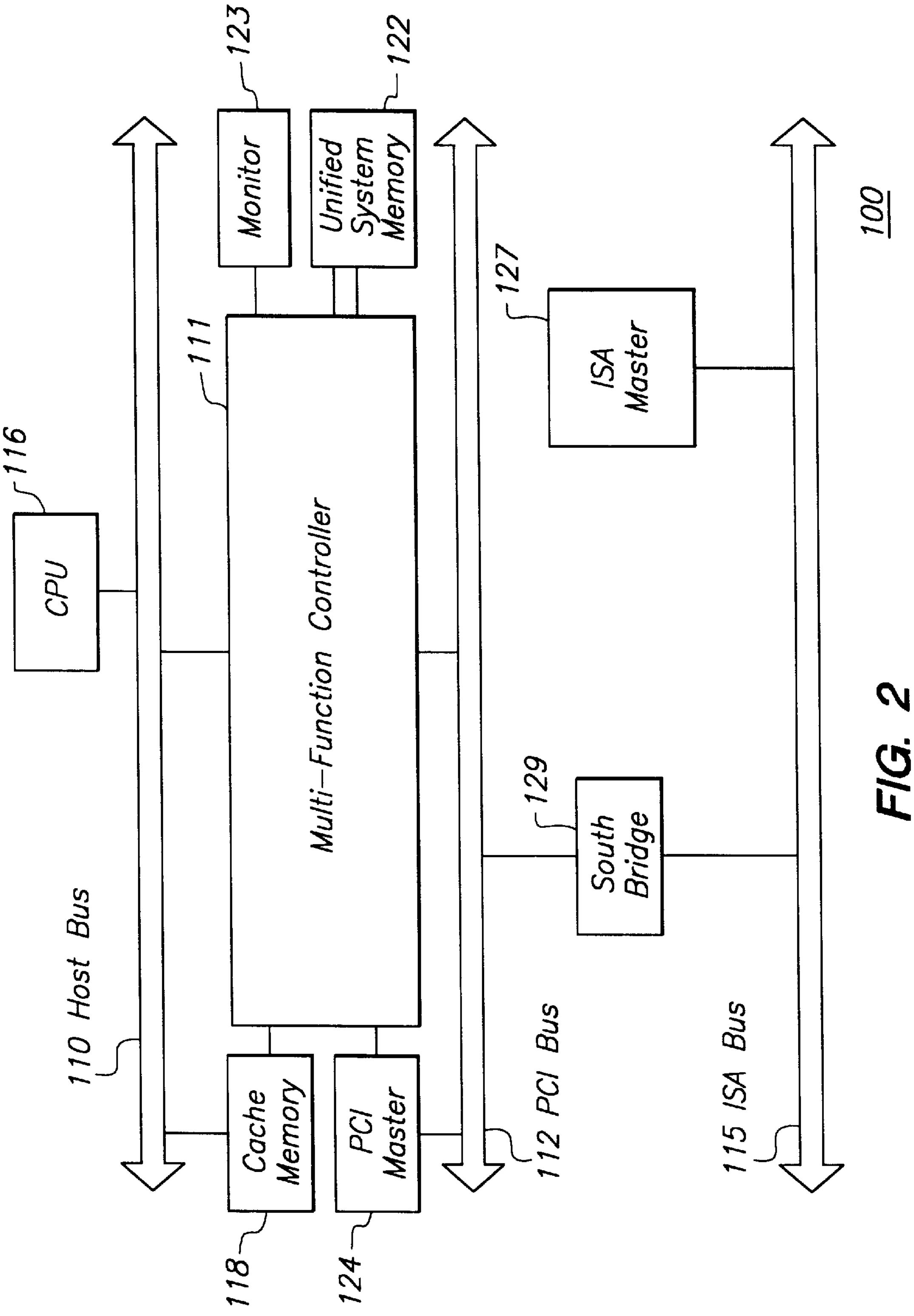
FIG. 2 is a block diagram of a preferred embodiment for a computer graphics display system, including the multi-function controller, according to the present invention.

FIG. 2 illustrates a preferred embodiment of the computer graphics display system 100 of the present invention. The system 100 includes three main buses: a host bus 110, a Peripheral Component Interconnect/Interface (PCI) bus 112 and an Industry Standard Architecture (ISA) bus 115. The host bus 110 preferably runs at 50–100 MHz and is eight or more bytes wide. The PCI bus 112 runs at approximately 33 Mhz and is four bytes wide and the ISA bus 115 runs at 6–8 Mhz and is two bytes wide. A central processing unit (CPU) 116, such as the Intel Pentium Processor, is connected to the host bus 110.

Coupled to both the host and PCI buses 110, 112 is a multi-function controller 111. The multi-function controller 111 performs the functions of a PCI bridge, cache controller, system memory controller, and graphics/video processor. In an alternate embodiment, the multi-function controller 111 may incorporate other components such as an audio processor (not shown) and other multimedia components (not shown).

A unified system memory 122, which stores both system and graphics/video data, and a cache memory 118 are coupled to the multi-function controller 111 and controlled by the multi-function controller 111. A monitor 123 displays graphics or video images generated by the multi-function controller 111. For instance, the monitor 123 could be a conventional CRT or LED panel.

A PCI bus master 124 controls the transfer of information on the PCI bus to and from the system memory 122, and an ISA bus master 127 controls the transfer of information on the ISA bus. A south Bridge 129 couples the ISA and PCI buses and controls information traveling between the PCI and ISA buses 112, 115.

The unified system memory device 122 includes a section for graphics and video data and a section for data for the rest of the system 100. An example of the system memory device 122 is one that includes up to five sixty-four bit banks, where each bank consists of two conventional thirty-two bit single in-line memory modules (SIMM) or one conventional sixty four bit dual in-line memory module (DIMM). This allows for a range of from four to 512 megabytes of system memory, where from 0.5 megabytes to four megabytes of system memory are dedicated to graphics data.

Figure 3:
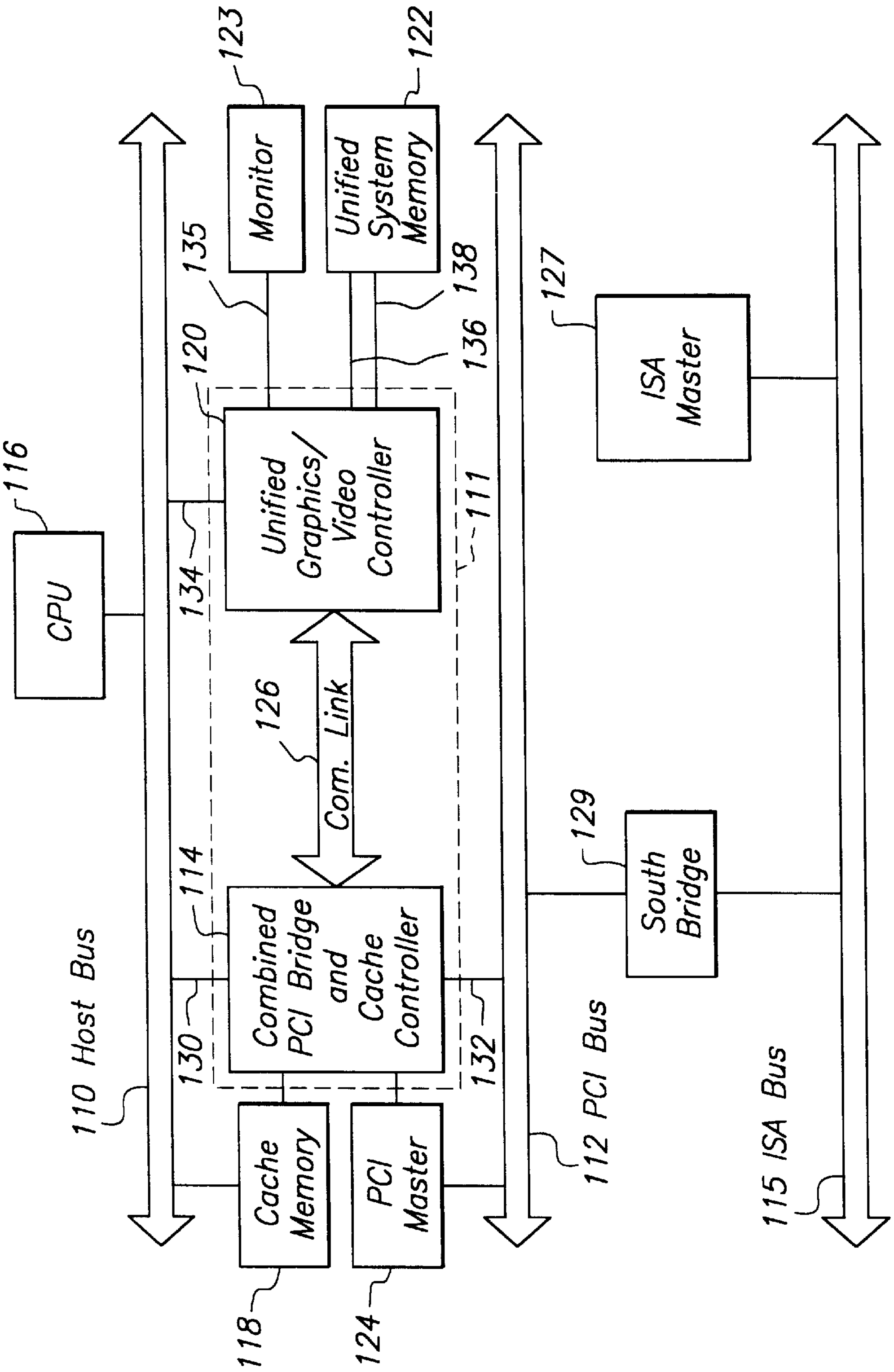
FIG. 3 is a block diagram of the computer graphics display system showing the multi-function controller in more detail.

Referring to FIG. 3, the multi-function controller 111 is shown in detail and comprises a combined PCI bridge and cache controller 114, a communications link 126, and a unified graphics/video controller 120. The multi-function controller 111 can be a single chip or several chips, and, in one embodiment, all the components of the combined PCI bridge/cache controller are integrated into one chip and all the components of the unified graphics/video controller are integrated into another chip.

The unified graphics/video controller 120 has four principal functions: (1) generating graphics or video information in response to a command from the CPU 116, (2) controlling the unified system memory device 122, (3) temporarily storing and routing data traveling to and from either the CPU 116, the cache 118, the system memory device 122 or a graphics/video processor within the unified graphics/video controller 120, and (4) generating the graphics/video image on the monitor 123.

The combined PCI bridge/cache controller unit 114 has four principle functions: (1) controlling the cache 118, (2) controlling information traveling between the PCI bus 112 and the host bus 110, (3) controlling access to the PCI bus, and (4) conveying to the unified graphics/video controller 120 information from either the CPU 116 or a PCI bus master 124, as well as from either the cache 118 or the ISA or PCI buses 112, 115.

The communications link 126 connects the unified graphics/video controller 120 and the combined PCI bridge/cache controller 114. The communications link 126 transfers data, address and control information between the unified graphics/video controller 120 and the combined PCI bridge/cache controller 114. The communications link 126 provides an information path that is preferably equal or wider that the width of the PCI bus 112 and that is preferably the same speed or faster than the PCI bus 112. In one embodiment, the communications link 126 is a time multiplexed, synchronous bus that has half the width and twice the speed of the PCI bus 112 and that uses nine lines to carry handshaking signals and twenty lines to carry data, control and address information.

A CPU-control bus 130 carries address and control information to and from the CPU 116 and the combined PCI bridge/cache controller unit 114. Similarly, a PCI-control bus 132 carries address, control, and data information between the combined PCI bridge/cache controller unit 114 and the PCI bus master 124. A CPU-data bus 134 carries data between the CPU 116 and the unified graphics/video controller 120, and a monitor bus 135 carries information from the unified graphics/video controller 120 to the monitor 123. Additionally, control and address signals travel between the unified graphics/video controller 120 and the unified system memory device 122 along a memory-control bus 136, and data travels between the unified graphics/video controller 120 and the unified system memory device 122 along a memory-data bus 138.

In one embodiment, all control and address information for the unified graphics/video controller 120 from the CPU 116 is sent to the PCI bridge/cache controller 114, which, via the communications link 126, instructs the unified graphics/video controller 120 accordingly. For example, when the CPU 116 needs to write data to or read data from either the unified system memory device 122 or a buffer in the unified graphics/video controller 120, the CPU 116 transmits the appropriate control and address information to the combined PCI bridge/cache controller 114 via the CPU-control bus 130. The combined PCI bridge/cache controller 114 then transmits the address and control information to the unified graphics/video controller 120 through the communications link 126.

If the command is a read, the unified graphics/video controller 120 passes the requested read data to the CPU 116 or the cache 118. Specifically, the unified graphics/video controller 120 retrieves the read data from a specified address and places it on the CPU-data bus 134 for sampling by the CPU 116 or the cache 118. The unified graphics controller 120 then informs the combined PCI bridge/cache controller, via the communications link 126, that the read command has been executed, and the combined PCI bridge/cache controller 114 informs the CPU 116, via the cpu-control bus 130, that the read data is on the cpu-data bus 134.

If the command is a write, the unified graphics/video controller 120 retrieves the write data from the CPU 116 or the cache 118 and stores it. Specifically, the CPU 116 or the cache 118 drives the write data on the CPU-data bus 134, where the unified graphics/video controller 120 retrieves it. The write data is then stored within the unified graphics/video controller 120 or within the system memory device 122, depending on the address information sent by the CPU 116 via the combined cache controller/PCI bridge 114. The unified graphics/video controller 120 sends a signal, via the communications link 126, to the combined cache controller/PCI bridge 114 after it has retrieved the write data from the cpu-data bus 134. The combined PCI bridge/cache controller 114 then informs the CPU that the write data no longer need to be driven on the cpu-data bus 134.

Control and address information from the PCI bus master 124 to the unified graphics/video controller 120 also passes through the PCI bridge/cache controller 114. For instance, when the PCI bus master 124 needs to read data from or write data to the unified system memory device 122 or a buffer in the unified graphics/video controller 120, the PCI bus master 124 transmits the control, the address, and any data information to the combined cache controller/PCI bridge 114 via a PCI-control bus 132. The combined PCI bridge/cache controller 114 then conveys the control, address, and data information to the unified graphics/video controller 120.

If the command is a read, the unified graphics/video controller 120 sends the requested data through the PCI bridge/cache controller. Specifically, the unified graphics/video controller 120 retrieves the read data from the location specified by the PCI master 124 and sends it to the combined cache controller/PCI bridge 114 via the communications link 126. The combined cache controller/PCI bridge 114 then drives the data on the PCI-control bus 132.

If the command is a write, the PCI bus master send the write data to the combined cache controller/PCI bridge 114 via the PCI-control bus 132. The combined cache controller/PCI bridge 114 then drives the data on the communications link 126, where the unified graphics/video controller 120 retrieves it. The write data is then stored within the unified graphics/video controller 120 or within the unified system memory device 122.

If the CPU 116 wants to read data from a register or memory connected to the PCI bus or ISA buses 112, 115, it will send the appropriate address and control information to the combined PCI bridge/cache controller 114, which will pass the information to the location designated in the address information. The CPU 116 will receive the requested read data through the unified graphics/video controller 120. In particular, the combined PCI bridge/cache controller 114 will retrieve the read data from the PCI bus 112 and send it to the unified graphics/video controller 120, which will then place the data on the CPU-data bus 134 for sampling by the CPU 116. When the CPU 116 needs to write data to a register or memory connected to the PCI or ISA bus 112, 115, it will send the appropriate command and address information via the CPU-control bus 130 to the combined cache controller/PCI bridge unit 114, which will then signal the unified graphics/video controller 120 to sample write data driven on the CPU-data bus 136 by the CPU 116. The unified graphics/video controller 120 will then send, via the communications link 126, the data to the combined cache controller/PCI bridge unit 114, where the data will be driven on the PCI-control bus 132 and sent to the appropriate component or agent on the PCI bus 132.

Figure 4:
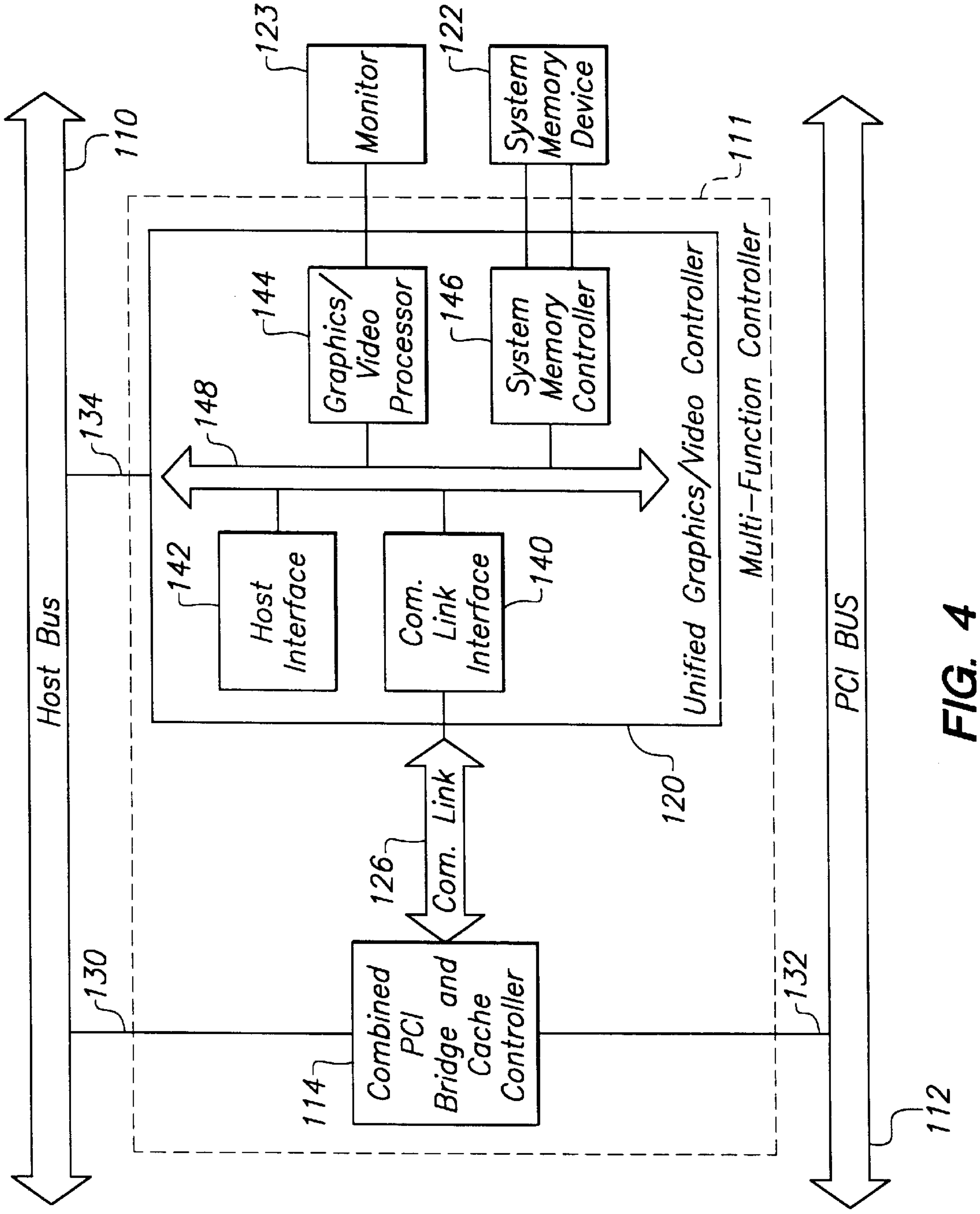
FIG. 4 is a block diagram of a preferred embodiment of a unified graphics/video controller located within the multi-function controller according to the present invention.

Referring now to FIG. 4, there is shown a block diagram of the unified graphics/video controller 120. The unified graphics/video controller 120 interfaces with communications link 126 at a communication link interface 140 and with the host bus at a host interface 142. A graphics/video processor 144, such as any 3D graphics processor manufactured by S3, Inc. or such as any graphics processor from the Trio or Virge family of graphic/video processors (e.g. Trio 64V+) manufactured by S3, Inc., of Santa Clara, Calif., generates graphics and video information in response to a command from the CPU 116. The CPU 116 sends commands to the graphics/video processor 144 by writing data either directly to the graphics/video processor 144 or to the unified system memory 122, where it is later retrieved by the graphics/video processor 144. The unified graphics/video controller 120 also includes a system memory controller 146 for controlling the system memory device 122. The integration of the system memory controller 146 into the unified graphics/video controller 120 provides tighter control and more flexibility in handling memory data access from various sources. The system memory controller 146 is created using known unified memory design techniques.

Information travels through the unified graphics/video controller 120 via an internal bus 148. Note that, although FIG. 4 illustrates the monitor 123 directly connected to the graphics/video processor 144, the monitor 123 may be connected to the internal bus 148 instead (and thus coupled to the graphics/video processor through the internal bus 148). Similarly, the unified system memory device 122 may be connected to the internal bus 148 instead of the system memory controller 146.

Figure 5:
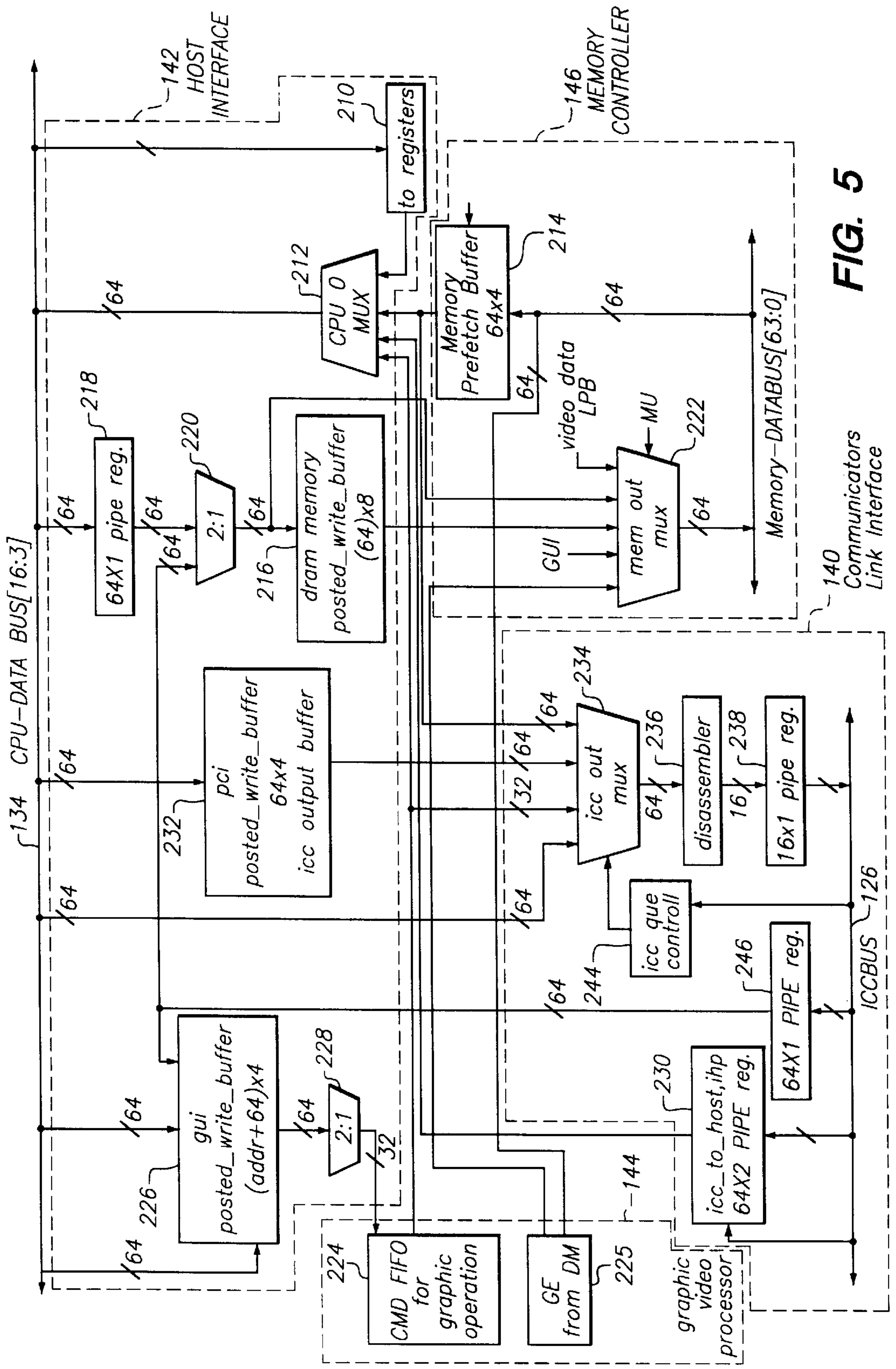
FIG. 5 is a block diagram of data buffers and data path within the unified graphics/video controller of the present invention.

FIG. 5 illustrates an example of the layout of the data buffers used for the data path in the host interface 142, the communications link interface 140, the graphics/video processor 144, and the system memory controller 146. With respect to the host interface 142, data from the CPU 116 may be stored in the I/O registers 210. All data traveling to the host bus 110 passes through multiplexer 212 before being placed on the CPU-data bus 134. Data from the cache 118 or the CPU 116 that is to be written into the system memory 122 travels through a 64×1 pipe register 218 to a multiplexer 220 and into a memory write buffer 216, where, if necessary the data is temporarily stored before being written into the system memory 122. A PCI write buffer 232 temporarily stores data from the CPU 116 and en route to the PCI bus 112 before the unified graphics/video controller 120 places the data on the communications link 126. Similarly, the unified graphics/video controller 120 temporarily stores data traveling from the CPU 116 to the graphics processor 144 in a write buffer 226. The write buffer 226 then passes the data to a multiplexer 228, where it is subsequently transferred to the graphics processor 144.

With respect to the communications link interface 140, data traveling from the communications link 126 to the host bus 110 travels through a 64×2 pipe register 230. Data to be stored in the graphics processor 144 or the system memory 122 passes through a 64×1 pipe register 246. A queue controller 244 receives control signals from the combined PCI bridge/cache controller 114, and from the control signals generates a select signal which controls a multiplexer 234. The multiplexer 234 receives all data traveling to the communications link 126. The select signal determines which data will be passed to a dissembler 236, which divides the sixty-four bit data into a number of parts, depending on the width of the communications link. For instance, if the communications link 126 is sixteen bits wide, the data is divided into four sixteen bit parts. From the dissembler 236, the data then travels to a 16×1 pipe register 238 and on the communications link 126.

With respect to the memory controller 146, all data traveling to the system memory 122 passes through a multiplexer 222, and all data retrieved from the system memory 122 is temporarily stored in a memory prefetch buffer 214. Within the graphics processor 144, a command FIFO 224 stores graphics commands received from the CPU. Additionally, a graphics buffer 225 stores graphics data generated by the graphics processor 144 and traveling between the graphics processor 144 and the system memory 122.

Figure 6:
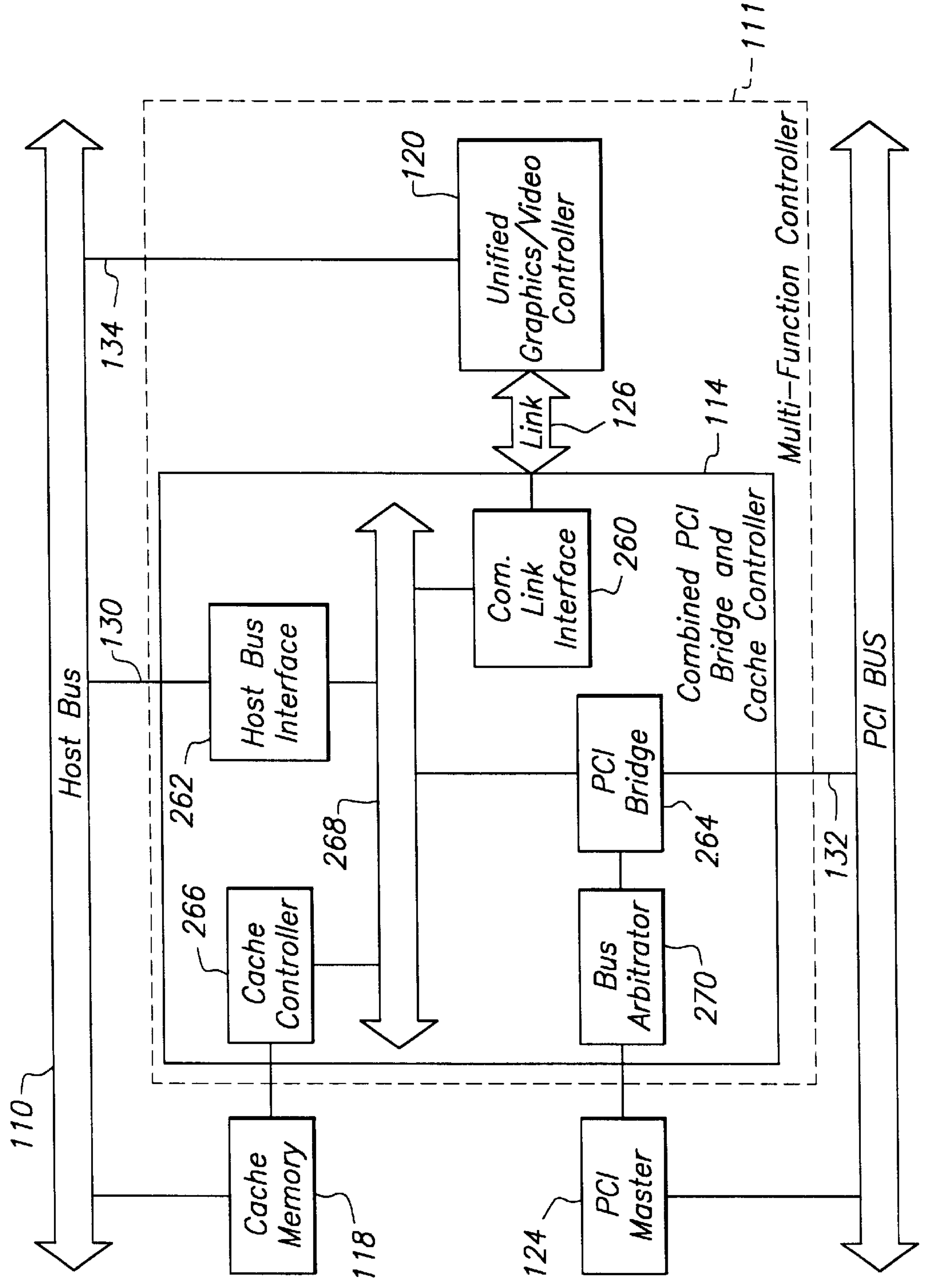
FIG. 6 is a block diagram of a combined PCI bridge/cache controller located within the multi-function controller of the present invention.
Figure 7:
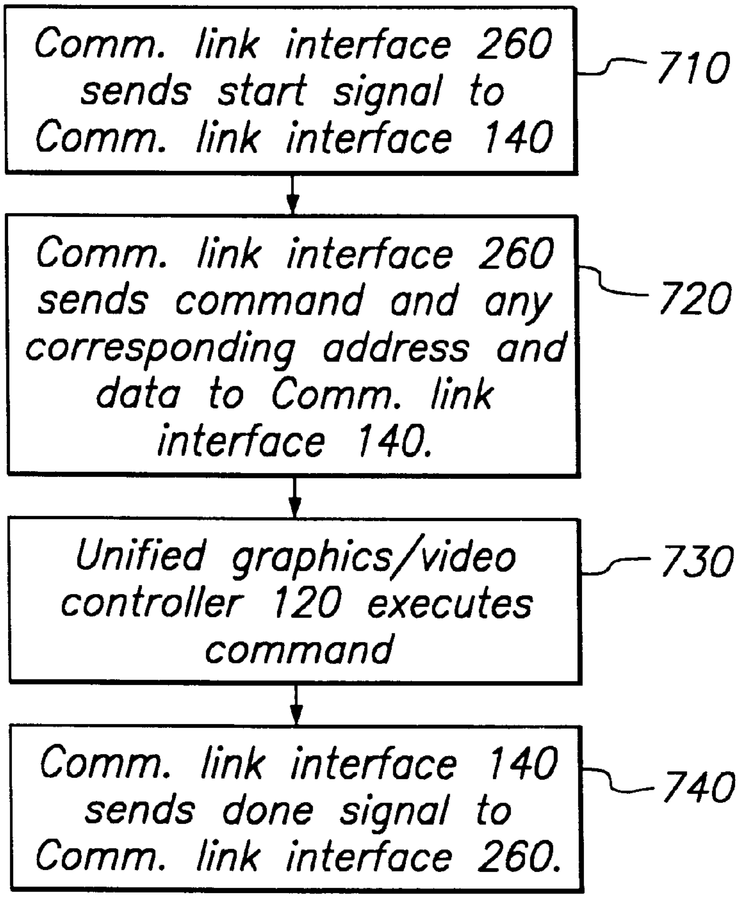
FIG. 7 is a flow chart illustrating the communication flow between the unified graphics/video controller and combined PCI bridge/cache controller.

Referring now to FIG. 6, there is shown the combined PCI bridge/cache controller 114. At a communications link interface 260, the combined PCI bridge/cache controller unit 114 transmits address, control and data information to the unified graphics/video controller 120 in response to the combined PCI bridge/cache controller receiving a command for the unified graphics/video controller. Specifically, as shown in FIG. 7, communications link interface 260 sends 710 a start signal to communications link interface 140 in the unified graphics video controller 120 indicating the start of communications link bus cycle. Communications link interface 260 then sends 720, via the communications link 126, the command and any corresponding address and data information to the communications link interface 140 via the communications link 126. The unified graphics/video controller 120 then performs 730 the task specified the command. After the task has been performed, communications link interface 140 sends 740 a done signal, via the communications link 126, to communications link interface 260, indicating that the command has been carried out and thereby ending the communications link 126 bus cycle.

In some cases, the communications link interface 140 may send the done signal one clock cycle before the unified graphics/video controller 120 completes execution of the command. For instance, if the command requires that the unified graphics/video controller 120 drive data requested by the CPU 116 on the cpu-data bus 134, one communications link 126 clock cycle before the unified graphics/video controller 120 drives the data on the cpu-data bus 126, communications link interface 140 will send the done signal to communications link interface 260. This is because by the time the combined PCI bridge and cache controller 114 informs the CPU 126 that data is waiting on the cpu-data bus 134, the unified graphics/video controller will have already driven the data on the cpu-data bus 134. Communications link interfaces 260 and 140 are implemented using known interface design techniques.

At a host interface 262, the combined PCI bridge/cache controller 114 transmits address, control, and data information to the CPU 116 and receives address, control, and data information from the CPU 116. The host bus interface 262 determines where information received at the combined cache controller/PCI bridge 114 should be sent, and sends the information to the appropriate place (e.g. cache 118, unified graphics/video controller 120, PCI bridge 264, and etc.). Information being sent from the PCI bridge/cache controller 114 to the host bus is sent out through the host interface 262. The host interface 262 is implemented using known interface design techniques.

The combined PCI bridge/cache controller includes a conventional PCI bridge 264, which controls information traveling between the host bus 110 and the PCI bus 112, and includes a conventional cache controller 266, which controls the transfer of data between the cache 118 and the host bus 110. Information travels through the combined PCI bridge/cache controller 114 on an internal bus 268.

The combined cache controller/PCI bridge 114 also includes a conventional bus arbiter 270 which controls access to the PCI bus 112. Components of the graphics display system 100 that initiate use of the PCI bus 112 have a grant line and a request line coupled to the bus arbiter 270. Each of such components is assigned a fixed priority for bus access. The bus arbiter 270 receives bus access requests on the request lines from different components on the PCI bus 112 and grants bus access to the requesting component with the highest priority by asserting a grant signal on the grant line coupled to that component.

What is claimed is:

1. A controller for use in a computer graphics system having a system memory and a CPU coupled to a host bus, the controller comprising:

a unified graphics controller comprised of a graphics processor coupled to a system memory controller that controls the system memory, the unified graphics controller being coupled to the system memory and a dedicated CPU-data bus that carries data between the CPU and the unified graphics controller, the CPU-data bus being directly coupled to the host bus whereby the graphics processor receives data directly from the CPU; and a bus bridge that controls transfer of at least some of the information on a bus in the computer graphics system, receives address and control information from the CPU through a CPU-control bus coupled to the host bus, and sends address and control information to the unified graphics controller though a communications link coupled to the unified graphics controller, wherein all address control information for the unified graphics controller from various components in the computer graphics system are received by the unified graphics controller from the bus bridge through the communications link.

2. The controller of claim 1 wherein the graphics processor is a video processor.

3. The controller of claim 1 further comprising a cache controller for controlling a cache in the computer graphics system, the cache controller coupled to the graphics processor.

4. The controller of claim 1 wherein the unified graphics controller is integrated into a single chip and the bus bridge and the cache controller form a combined bus bridge/cache controller integrated into a single chip.

5. The controller of claim 4 wherein the unified graphics controller and the combined bus bridge/cache controller form a multi-function controller integrated into a single chip.

6. The controller of claim 1 wherein the system memory contains graphics data and non-graphics data.

7. The controller of claim 1 further comprising a plurality of data buffers coupled to the system memory controller for storing data traveling between the system memory and a remainder of the computer graphics system.

* * * * *